United States Patent [19]
Vassiliou

[11] 4,064,303
[45] Dec. 20, 1977

[54] PROCESS FOR DECORATING HEAT-STABLE POLYMER COATING COMPOSITIONS

[75] Inventor: Eustathios Vassiliou, Newark, Del.

[73] Assignee: E. I. Du Pont de Nemours and Company, Wilmington, Del.

[21] Appl. No.: 606,299

[22] Filed: Aug. 22, 1975

Related U.S. Application Data

[63] Continuation-in-part of Ser. No. 509,937, Sept. 27, 1974, abandoned, and a continuation-in-part of Ser. No. 552,873, Feb. 25, 1975, abandoned, which is a continuation-in-part of Ser. No. 509,937, Sept. 27, 1974, abandoned.

[51] Int. Cl.[2] ........................ B32B 3/10; B32B 27/00; B05D 3/02

[52] U.S. Cl. .................................... 428/201; 427/145; 427/258; 427/261; 427/278; 427/302; 427/333; 427/340; 427/341; 427/385 B; 427/385 A; 427/385 R; 427/388 R; 427/399; 427/400; 428/199; 428/204; 428/209; 428/207; 428/203; 428/411; 428/419; 428/420; 428/422; 428/426; 428/432; 428/435; 428/457; 428/458; 428/470; 428/474

[58] Field of Search ............... 428/422, 470, 913, 420, 428/199, 201, 209, 207, 203, 204, 411, 419, 457, 458, 474, 476, 432, 435; 427/400, 228, 302, 399, 333, 256, 258, 261, 385, 387, 340, 341, 388 R, 385 B, 385 R, 385 A, 145

[56] References Cited

U.S. PATENT DOCUMENTS

| | | | |
|---|---|---|---|
| 2,866,765 | 12/1958 | Smith | 428/422 |
| 2,961,341 | 11/1960 | Long | 428/422 |
| 2,979,418 | 4/1961 | Dipner | 428/422 |
| 3,293,203 | 12/1966 | Paulus | 260/42.27 |
| 3,447,940 | 6/1969 | Halleck | 260/29.6 F |
| 3,470,014 | 9/1969 | Koblitz | 428/422 |
| 3,473,949 | 10/1969 | Eldred | 427/302 |
| 3,489,595 | 1/1970 | Brown | 428/422 |
| 3,493,418 | 2/1970 | Amano | 428/407 |
| 3,526,532 | 9/1970 | Heiberger | 428/422 |
| 3,577,257 | 5/1971 | Hutzler | 427/333 |
| 3,692,558 | 9/1972 | Werner | 428/422 |

*Primary Examiner*—Ellis Robinson

[57] ABSTRACT

The appearance of a heat-stable polymer coating is enhanced by a process which produces a decorative pattern within a heat-stable polymer coating. The process consists essentially of applying, in a decorative pattern, an oxidation catalyst composition which diffuses into the heat-stable polymer coating composition and renders the pattern visible, upon baking, within the baked coat produced by the coating composition.

16 Claims, No Drawings

PROCESS FOR DECORATING HEAT-STABLE POLYMER COATING COMPOSITIONS

CROSS-REFERENCE TO RELATED APPLICATIONS

This application is a continuation-in-part of copending application Ser. No. 509,937, filed Sept. 27, 1974 now abandoned, and a continuation-in-part of copending application Ser. No. 552,873, filed Feb. 25, 1975 now abandoned, which itself is a continuation-in-part of application Ser. No. 509,937.

BACKGROUND OF THE INVENTION

1. Field of the Invention

This invention relates to a process which renders a decorative pattern visible within a heat-stable polymer coating.

2. Prior Art

Articles coated with heat-stable polymer compositions of various types have come into widespread use in recent years. Heat-stable polymer coated articles are useful for purposes requiring or aided by a heat-stable surface. Especially useful are heat-stable polymer coating compositions which provide lubricious surfaces. The uses of coated articles having lubricious surfaces range from bearings to ship bottoms and from iron soleplates to ice cube trays.

To achieve maximum consumer demand for an article, consumer expectations must be met. One consumer expectation is to have a product which is pleasing to his or her aesthetic sense and which is capable of maintaining this pleasing effect throughout the product's useful life.

The process of this invention produces a decorative pattern visible within coatings produced by a heat-stable polymer coating composition.

Decorative areas of the coating wear as well as non-decorative areas for the following reasons. The decorative pattern extends through the entire thickness of the coating; therefore, as the coating is worn thinner, the decorative pattern is still present. Concentration of heat-stable polymer is uniform throughout the coating, i.e., the decorative and non-decorative areas; therefore, the coating has uniform heat stability throughout. Thickness of the coating is uniform, i.e., neither the decorative nor non-decorative areas are higher than the other, thereby not facilitating chipping of a higher area.

SUMMARY OF THE INVENTION

According to the present invention, there is provided a process which renders a decorative pattern visible within a baked coating produced by a heat-stable polymer coating composition. The process consists essentially of applying the heat-stable polymer coating composition either as a subsequent coat over or directly under an oxidation catalyst composition which is arranged in a decorative pattern, wherein the oxidation catalyst or its decomposition or oxidation products diffuse into the coat and either by reacting with components of the coating, by catalyzing reactions within the coating or by itself renders, upon baking, the decorative pattern visible within the coating produced by the heat-stable coating composition.

DETAILED DESCRIPTION OF THE INVENTION

Although any of the compounds described within this application can be utilized in compositions involved in the process, when cookware is involved only Food and Drug Administration approved compounds should be used.

A decorative pattern is any image, picture, design, configuration, or illustration which can be formed by any conventional method of applying ink.

A heat-stable polymer composition consists of at least a heat-stable polymer and a liquid carrier.

A heat-stable polymer is a polymer which is not affected by temperatures above 300° C which would decompose, oxidize or otherwise adversely affect most organic compounds. Some examples of heat-stable polymers are silicones, polysulfides, polymerized parahydroxy benzoic acid, polysulfones, polyimides, polyamides, polysulfonates, polysulfonamides, H-resins (sold by Hercules Corporation), and fluorocarbons. One or more heat-stable polymers can be present in the composition.

The preferred heat-stable polymers are fluorocarbons because of their high temperature stability and release properties. The fluorocarbon polymers used are those of hydrocarbon monomers completely substituted with fluorine atoms or a combination of fluorine and chlorine atoms. Included in this group are perfluoroolefin polymers such as polytetrafluoroethylene (PTFE) and copolymers of tetrafluoroethylene and hexafluoropropylene in all monomer unit weight ratios, fluorochlorocarbon polymers such as polymonochlorotrifluoroethylene, and copolymers of tetrafluoroethylene and perfluoroalkyl vinyl ethers. Mixtures of these can also be used.

The heat-stable polymer is ordinarily present in the composition at a concentration of 25% through 95%, preferably 70% through 90%, by weight of the total solids present in the composition.

Although a dry flour or powder of a heat-stable polymer can be used and a liquid carrier provided separately, a polymer in the form of an aqueous surfactant-stabilized dispersion is preferred for its stability and because it is most easily obtained in that form. Dispersions of heat-stable polymers in organic liquids such as alcohols, ketones, aliphatics or aromatic hydrocarbons, or mixtures of these, can also be used. In either case, the liquid generally serves as the carrier for the composition.

If desired, a colorant may be present in the heat-stable polymer composition.

A colorant is any compound which changes color when oxidized. Carbon and carbonaceous residues are examples of colorants.

For the purpose of this invention, a reaction such as oxidation of carbon black to carbon dioxide, in which a solid is oxidized to a fugitive gas, the solid thereby vanishing from the composition, is considered a color change.

Carbon can be present in concentrations up to 40% based on the weight of total solids of the composition, preferably in concentrations of 0.5–10%.

Carbonaceous residues are produced by decomposition or partial oxidation of organic compounds, which includes organometallic compounds. Organic compounds are normally present in coating composition to serve as dispersants, coalescing agents, viscosity builders, etc., or they can be added to serve as colorants.

Although absolute amounts of carbonaceous residues in the heat-stable polymer coating are usually extremely small, nevertheless, they give a definite coloration to a baked coating.

Examples of organic compounds which produce carbonaceous residues are polymers of ethylenically unsaturated monomers, which depolymerize, and whose depolymerization products vaporize, in the temperature range of from 150° C below the fusion temperature to about the heat-stable polymer's decomposition temperature.

"Depolymerization" means degradation of a polymer to the point at which the degradation products are volatile at the temperature encountered in curing the coat. The degradation products can be monomers, dimers, or oligomers.

"Vaporize" means volatilization of the degradation products and their evaporation from the film.

Usually the polymers of ethylenically unsaturated monomers contain one or more monoethylenically unsaturated acid units.

Representative of these ethylenically unsaturated monomers are alkyl acrylates and methacrylates having 1 to 8 carbon atoms in the alkyl group, styrene, 2-methyl styrene, vinyl toluene, and glycidyl esters of 4 to 14 carbon atoms.

Representative of the monoethylenically unsaturated acids are acrylic acid, methacrylic acid, fumaric acid, itaconic acid, and maleic acid (or anhydride).

The polymer of an ethylenically unsaturated monomer which produces a carbonaceous residue can be present as a coalescing agent in the composition at a concentration of about 3% through 60% by weight of total heat-stable polymer and residue producing polymer.

The heat-stable polymer composition can be pigmented or unpigmented. Any pigment or combination of pigments ordinarily used in this sort of composition can be used. Typical of these pigments are titanium dioxide, aluminum oxide, silica, cobalt oxide, iron oxide, etc. The total amount of pigment ordinarily present is at a concentration of up to 40% by weight of the total solids in the composition.

The composition of this invention can contain mica particles, mica particles coated with pigment, and glass and metal flakes. These particles and flakes have an average longest dimension of 10 to 100 microns, preferably 15–50 microns, with no particles or flakes having a longest dimension of more than about 200 microns. Particle and flake size is measured optically against a standard.

The mica particles coated with pigment preferred for use are those described in U.S. Pat. No. 3,087,827 granted to Klenke and Stratton, and U.S. Pat. Nos. 3,087,828 and 3,087,829 granted to Linton. The disclosures of these patents are incorporated into this specification to describe the various coated micas and how they are prepared.

The mica particles described in these patents are coated with oxides or hydrous oxides of titanium, zirconium, aluminum, zinc, antimony, tin, iron, copper, nickel, cobalt, chromium, or vanadium. Titanium dioxide coated mica is preferred because of its availability. Mixtures of coated micas can also be used.

Representative of metal flakes which can be used are aluminum flake, stainless steel flake, nickel flake, and bronze flake. Mixtures of flake can also be used.

The mica particles, coated mica particles, or glass and metal flakes are ordinarily present in coating compositions at a concentration of about 0.2–20%, by weight of total solids.

The composition can also contain such conventional additives as flow control agents, surfactants, plasticizers, coalescing agents, etc., as seem necessary or desirable. These additives are added for reasons, in ways and in amounts known to artisans.

The amount of total solids in the composition will be governed by the substrate to which the composition is to be applied, method of application, curing procedure, and like factors. Ordinarily, the composition will contain 10% through 80% by weight of total solids, but preferably 30–50%.

The oxidation catalyst composition must include an oxidation catalyst and can include color enhancers, viscosity builders or thickeners, wetting agents, inert pigments, decomposable resins and polymers, heat-stable resins and polymers, neutralizers, liquid carriers, and other adjuncts.

Color enhancers are heat-unstable organic compounds which decompose to produce colorants, thus enhancing the contrast between decorative pattern and background. Examples of color enhancers are sugar, styrene, starch, fatty acid, and glycerides.

Polytetrafluoroethylene and other heat-stable polymers are examples of viscosity builders or thickeners. Preferably the same heat-stable polymer utilized in the coating composition is utilized as the viscosity builder or thickener.

Examples of pigment are carbon black, iron oxide, titanium dioxide and cobalt oxide. When pigment is present in the oxidation catalyst composition, at least an equal amount, preferably three to ten times as much, of heat stable polymer will, preferably, also be present.

The oxidation catalyst composition can contain one or more oxidation catalysts.

An oxidation catalyst is a compound which promotes oxidation under the baking conditions required for fabrication of coated articles. The oxidation catalyst can promote oxidation either itself or through its decomposition or oxidation products. The oxidation catalyst causes the decorative pattern to be rendered visible, upon baking, either by reacting with the components of the coating, or catalyzing reactions within the coating or by adding color itself.

Included in this class of compounds are compounds containing one or more of the following:

| | | |
|---|---|---|
| Chromium | Cerium | Tin |
| Copper | Thorium | Tungsten |
| Cobalt | Calcium | Lithium |
| Iron | Manganese | Sodium |
| Nickel | Bismuth | Potassium |
| Vanadium | Cadmium | Lead |
| Tantalum | Molybdenum | Zinc |

Preferred compounds are those which are produced by reaction of a metal from the following list (1) with an acid to form a salt compound of list (2).

| (1) Metals | | |
|---|---|---|
| | Bismuth | Lead |
| | Cerium | Manganese |
| | Cobalt | Nickel |
| | Iron | |

| | |
|---|---|
| (2) Salts | |
| Acetate | Octoate |
| Caprate | Oleate |
| Caprylate | Palmitate |
| Isodecanoate | Ricinoleate |
| Linoleate | Soyate |
| Naphthenate | Stearate |
| Nitrate | Tallate |

More preferred oxidation catalyst compounds are:

| | |
|---|---|
| Cobalt octoate | Bismuth octoate |
| Cerium Octoate | Nickel octoate |
| Manganese octoate | Lead octoate |
| Iron octoate | |

An oxidation catalyst can also be present within the heat-stable polymer coating composition. The oxidation catalyst of the coating composition can either be the same or different from the oxdiation catalyst used in the oxidation catalyst composition.

The oxidation catalyst composition can be applied by any conventional method of applying ink. The preferred methods are to apply the oxidation catalyst composition by "Intaglio" offset, e.g., using a Tampoprint® machine sold by Dependable Machine Co., Inc., or silk screening.

The oxidation catalyst is dissolved or dispersed in suitable carriers for the particular oxidation catalyst.

The percentage range by weight of metal content to the total weight of oxidation catalyst plus carrier depends on the oxidation catalyst's formulation and application method. The preferred percentage range is is 1–20%, although lower than 1% and higher than 20% concentration can also be used depending on the coating methods and conditions, baking methods and conditions, as well as characteristics of the oxidation catalyst.

The baking temperature range of the process is dependent mainly upon which heat-stable polymer composition is utilized. The process of this invention is utilizable upon any conventionally used substrate. The substrate may be coated with a primer prior to the application of the oxidation catalyst composition. The substrate is preferably pre-treated prior to the application of any coating composition. Pre-treatments methods include flame-spraying, frit-coating, grit-blasting, and acid- or alkali-treating. A metal substrate is preferably pre-treated by grit-blasting, by flame-spraying of a metal or a metal oxide, or by frit-coating, although the compositions can be applied successfully to phosphated, chromated, or untreated metal. A glass substrate is preferably grit-blasted or frit-coated.

A primer composition, if desired, can be applied either under or over the oxidation catalyst composition. The primer composition can be applied in any of the customary ways, which include spraying, roller coating, dipping, and doctor blading. Spraying is generally the method of choice.

In other words, included in the process are various sequences of applying the compositions to the substrate, for example, 1. first the oxidation catalyst composition, and then the coating composition;

2. first the coating composition, and then the oxidation catalyst composition;

3. first a primer composition, then the oxidation catalyst composition, and then the coating composition;

4. first the oxidation catalyst composition, then a primer composition, and then the coating composition; or 5. first a primer composition, then the coating composition, and then the oxidation catalyst composition.

The primer composition can be any conventionally used primer coating. An example is the silica-perflurocarbon primer disclosed by E. J. Welch in U.S. Pat. application Ser. No. 405,798, filed Oct. 12, 1973.

The coating composition is applied to a thickness of about 0.5–5 mils (dry) and baked for a time and at a temperature sufficient to fuse or cure the heat-stable polymer being used.

The process and composition of this invention are useful for any article that may use a heat-stable polymer surface; examples are cookware, especially fry pans, bearings, valves, wire, metal foil, boilers, pipes, ship bottoms, oven liners, iron soleplates, waffle irons, ice cube trays, snow shovels, saws, files and drills, hoppers andother industrial containers and molds.

The following example is illustrative of the invention. All parts are on a weight basis unless otherwise stated.

EXAMPLE 1

Five aluminum panels were grit-blasted with 80 mesh alumina grit at 5.62 kgs/cm$^2$ (kilograms per square centimeter).

A silica-fluorocarbon primer was prepared as follows:

| | | PARTS BY WEIGHT |
|---|---|---|
| (a) | Mix together: | |
| | Polytetrafluoroethylene (PTFE) aqueous dispersion, 60% solids | 478.76 |
| | Deionized water | 130.23 |
| | Colloidal silica sol, 30% solids in water ("Ludox AM" colloidal silica, sold by E. I. du Pont de Nemours and Company) | 327.18 |
| (b) | Separately mix "Triton X-100" (isooctylphenoxypolyethoxyethane nonionic surfactant sold by Rohm and Haas Co.) | 17.52 |
| | Toluene | 34.56 |
| | Butyl carbitol (diethylene glycol monobutyl ether acetate) | 13.36 |
| | Silicone solution (Dow Corning DC-801 silicone 60% solids in xylene) | 34.56 |

Added to (a) were 85.52 parts of (b) in a small stream, with stirring, over a 2–3 minute period. To this were added, with stirring:

| | |
|---|---|
| Titanium dioxide dispersion (45% solids dispersion in water) | 35.46 |
| Channel black dispersion (22% solids dispersion in water) | .05 |

Stirring was continued for 10–20 minutes.

The primer was sprayed onto all five grit-blasted aluminum panels to a thickness of 0.3-mil (dry) and dried in air.

The following oxidation catalyst compositions were stamped onto each of the five aluminum panels, using a separate stamp for each oxidation catalyst composition. The oxidation catalyst compositions were:

1. Cerium octoate in 2-ethylhexanoic acid (12% metal content by weight);

2. Cobalt octoate in mineral spirits (12% metal content by weight);

3. Calcium octoate in 2-ethylhexanoic acid (5% metal content by weight);

4. Bismuth octoate in 2-ethylhexanoic acid (85% metal content by weight);

5. Manganese octoate in mineral spirits (6.0% metal content by weight);

6. Iron octoate in 2-ethylhexanoic acid (10.5% metal content by weight).

Five fluorocarbon coating compositions were prepared. The coating composition differed in that each contained a different oxidation catalyst composition.

The oxidation catalyst composition utilized in the five coating compositions were as follows:

| | | PARTS BY WEIGHT |
|---|---|---|
| (1) | Cerium octoate in 2-ethylhexanoic acid (12% metal content by weight) | 3.04 |
| (2) | Cobalt octoate in mineral spirits (12% metal content by weight) | 3.04 |
| (3) | Bismuth octoate in 2-ethylhexanoic acid (8.5% metal content by weight) | 4.25 |
| (4) | Manganese octoate in mineral spirits (6.0% metal content by weight) | 6.14 |
| (5) | Iron octoate in 2-ethylhexanoic acid (10.5% metal content by weight) | 3.07 |

The fluorocarbon topcoats were prepared as follows:

a. Prepare a mill base by mixing in order and pebble milling:

| | PARTS BY WEIGHT |
|---|---|
| Titanium dioxide | 360.00 |
| Triethanolamine | 53.28 |
| Oleic acid | 26.72 |
| Deionized water | 360.00 |

b. With mixing, add 718.04 parts by weight of PTFE dispersion ("Du Pont TE-30") to 97.89 parts by weight of the produce of (c).

| | | | |
|---|---|---|---|
| (c) | Mix: | | |
| | Triethanolamine | | 26.76 |
| | Oleic acid | | 16.68 |
| | Toluene | | 56.04 |
| | Butyl carbitol | | 18.79 |
| | Oxidation catalyst composition | (the metal octoate in the amount stated above). | |

d. Slowly add the product of (c) to the product of (b) with mixing.

e. Slowly add, with mixing, 625.8 parts by weight of an aqueous dispersion, 40% solids, of a methyl methacrylate/ethyl acrylate/methacrylic acid polymer having a monomer weight ratio of 39/57/4 to the product of (*d*).

f. Slowly add, with mixing, 39.3 parts by weight water to the product of (*d*).

The five different fluorocarbon coating compositions were sprayed, one per each panel, onto the five panels to a thickness of 0.7-mil (dry) and dried in air.

The air-dried panels were baked at 430° C for five minutes.

The results are contained in the following chart.

THE COLOR AND/OR CONTRAST TO BACKGROUND OF DECORATIVE AREAS OF A COATING PRODUCED BY STAMPING DECORATIVE AGENTS BENEATH FLUOROCARBON COATING COMPOSITIONS CONTAINING VARIED OXIDATION CATALYST COMPOSITIONS

| | | Oxidation Catalyst Composition in Topcoat | | | | |
|---|---|---|---|---|---|---|
| | | Cerium Octoate | Cobalt Octoate | Bismuth Octoate | Manganese Octoate | Iron Octoate |
| | Color of Background | White | Mud | Buff | Beige | Beige |
| Decorative Agent | Cerium Octoate | Slightly Whiter | Slightly Light | White | Darker | Yellowish |
| | Cobalt Octoate | Dark | Greenish-Gray | Lighter | Greenish-Blue | Darker |
| | Calcium Octoate | Darker | Lighter | Darker | Slightly Darker | Darker |
| | Bismuth Octoate | Trace Yellow | Slightly Darker | Slightly Lighter | Slightly Lighter | Slightly Yellowish |
| | Manganese Octoate | Dark | Gray | Lighter | Darker | Slightly Different |
| | Iron Octoate | Dark | Reddish | Darker | Darker | Slight Rust |

The decorative pattern was rendered visible within the baked fluorocarbon coating

EXAMPLE 2

Prepare a primer composition by adding the following to a vessel in the order given and mixing

| | | PARTS BY WEIGHT |
|---|---|---|
| (1) | The polyamide acid amine salt solution of Example 1 of Application S.N.546,998, filed February 4, 1975 - (containing 18% of furfuryl alcohol and 10% of N-methyl-pyrrolidone) | 31.98 |
| (2) | Furfuryl alcohol | 3.21 |
| (3) | Deionized water | 109.47 |
| (4) | Pigment dispersion (Made by ball-milling a mixture of cobalt oxide - 45 parts water - 55 parts | 27.39 |
| (5) | $TiO_2$ coated mica ("Afflair" NF-152-D, sold by E. I. du Pont de Nemours and Company) | 7.6 |

Component (5) is added with vigorous mixing. After the addition is complete, the product is stirred for 10 minutes. To it are then added, with mixing,

| | | |
|---|---|---|
| (6) | PTFE dispersion (60% solids in water, Teflon ®TFE fluorocarbon resin, aqueous dispersion, T-30 sold by E. I. du Pont de Nemours and Company) | 91.17 |
| (7) | Ludox ®AM (Colloidal silica sold by E. I. du Pont de Nemours and Company) | 36.78 |

Prepare a topcoating composition by adding the following to a vessel in the order stated, with mixing,

| | | | | PARTS |
|---|---|---|---|---|
| (1) | The PTFE dispersion of (6) above | | | 179.7 |
| (2) | Deionized water | | | 2.7 |
| (3) | $TiO_2$ coated mica of (5) above (add with vigorous stirring) | | | 9.5 |
| (4) | Pigment dispersion of (4) above | | | 3.5 |
| (5) | Mixture of | | | |
| | Toluene | 30.8 | Parts | |
| | Triethanolamine | 40.0 | " | |
| | Butyl carbitol | 11.7 | " | |
| | Oleic acid | 12.7 | " | |
| | Cerium octoate solution (12% in 2-ethylhexanoic acid) | 7.9 | " | |
| | Isooctylphenoxypolyethoxy-ethanol | 4.4 | " | |
| | | | | 39.5 |
| (6) | Methyl methacrylate/ ethyl acrylate/ methacrylic acid 39/57/4 terpolymer dispersion (40% in water) | | | 33.4 |

Prepare the following four oxidation catalyst compositions:

| | | |
|---|---|---|
| (1) | Cobalt octoate in mineral spirits, 60% by weight (12% metal content by weight) | |
| (2) | Cerium octoate in 2-ethylhexanoic acid (12% metal content by weight) | |
| (3) | Manganese octoate in mineral spirits (6.0% metal content by weight) | |
| (4) | Cerium octoate in 2-ethyl hexanoic acid, (12% metal content by weight) | 1.5 |
| | Cobalt octoate in mineral spirits, 60% by weight, (12% metal content by weight) | .5 |
| | Oleic acid, 40% by weight | |

Prepare four aluminum panels by grit-blasting with 80 mesh alumina grit at 5.62 kg/cm² (kilograms per square centimeter).

Spray the primer composition onto all four grit-blasted aluminum panels to a thickness of 0.3-mil (dry) and dry in air.

Stamp, in a decorative pattern, one or different oxidation catalyst compositions (one oxidation catalyst per aluminum panel) onto each aluminum panel.

Spray the topcoat composition onto the aluminum panels to a thickness of 0.7-mil (dry) and dry in air.

Bake the air-dried panels at 430° C for 10 minutes.

The areas over the oxidation catalyst compositions are a different hue than the remaining areas, therefore, rendering the decorative pattern visible in the topcoat.

What is claimed is:

1. A process for decorating a heat-stable polymer coating on a substrate; the process consisting essentially of applying a heat-stable polymer composition either directly under or as a subsequent coat over an oxidation catalyst composition which is arranged in a decorative pattern on a substrate, and then baking the coating; wherein the oxidation catalyst or its decomposition product diffuses into the coating and either by reacting with the components of the coating, by catalyzing reactions within the coating or by itself renders, upon baking, the decorative pattern visible within the heat-stable polymer coating;

wherein the heat-stable polymer composition comprising:

a. heat-stable polymer stable at temperatures above 300° C, said polymer being silicone, polysulfides, polymerized parahydroxy benzoic acid, polysulfone, polyimide, polyamide, polysulfonate, polysulfonamide, fluorocarbon, or mixtures thereof, b. a liquid carrier, and C. optionally an oxidation catalyst;

D. optionally a colorant;

wherein the oxidation catalyst is a compound or mixture of compounds produced by reaction of a metal from list (1) with an acid to form a salt compound of list (2)

| | | |
|---|---|---|
| (1) | Metal | |
| | Cobalt | Bismuth |
| | Cerium | Nickel |
| | Manganese | Lead |
| | Iron | |
| (2) | Salts | |
| | Acetate | Octoate |
| | Caprate | Oleate |
| | Caprylate | Palmitate |
| | Isodecanoate | Ricinoleate |
| | Linoleate | Stearate |
| | Nitrate | Tallate |
| | Naphthenate | Soyate. |

2. The process of claim 1 wherein the oxidation catalyst composition contains one or more of the following compounds:

| | |
|---|---|
| Cobalt octoate | Bismuth octoate |
| Cerium octoate | Nickel octoate |
| Manganese octoate | Lead octoate |
| Iron octoate. | |

3. The process of claim 1 wherein the oxidation catalyst composition also includes color enhancers which are heat-unstable organic compounds which decompose to produce colorants, or viscosity builders or thickeners, wetting agents, pigments, decomposable resins and polymers, heat-stable resins and polymers, neutralizers, liquid carriers, or mixtures of the above.

4. The process of claim 1 wherein the heat-stable polymer is a fluorocarbon.

5. The process of claim 1 wherein the heat-stable polymer is a hydrocarbon monomer completely substituted with fluorine atoms or a combination of fluorine atoms and chlorine atoms.

6. The process of claim 1 wherein the heat-stable polymer is polytetrafluoroethylene, copolymer of tetrafluoroethylene and hexafluoropropylene or mixtures of the above.

7. The process of claim 1 wherein the heat-stable polymer composition contains a colorant.

8. The process of claim 7 wherein the colorant is carbon black, a carbonaceous residue, a carbonaceous residue precursor or a mixture thereof, in concentrations up to 40% based on the weight of total solids of the composition.

9. The process of claim 1 wherein the heat-stable polymer composition contains oxidation catalyst(s) selected from compounds produced by reaction of a metal from list (1) with an acid to form a salt compound of list (2).

| | | |
|---|---|---|
| (1) Metal | | |
| | Cobalt | Bismuth |
| | Cerium | Nickel |
| | Manganese | Lead |
| | Iron | |
| (2) Salts | | |
| | Caprate | Palmitate |
| | Caprylate | Acetate |
| | Isodecanoate | Ricinoleate |
| | Linoleate | Soyate |
| | Naphthenate | Stearate |
| | Octoate | Tallate |
| | Oleate | Nitrate. |

10. The process of claim 1 wherein the heat-stable polymer composition contains one or more of the following oxidation catalysts:

| | |
|---|---|
| Cobalt octoate | Bismuth octoate |
| Cerium octoate | Nickel octoate |

-continued

| | |
|---|---|
| Manganese octoate | Lead octoate |
| Iron octoate. | |

11. An article bearing a decorative pattern produced by the process of claim 1.

12. The process of claim 1 in which the heat-stable polymer is present in the composition at a concentration of at least 25% by weight of the total solids of the composition.

13. The process of claim 1 in which the heat-stable polymer is present in the composition at a concentration in the range of 25% to 95% of the total solids of the composition.

14. The process of claim 1 in which the heat-stable polymer is present in the composition at a concentration in the range of 70% to 90% of the total solids of the composition.

15. The process of claim 1 in which the heat-stable polymer composition is applied over the oxidation catalyst composition.

16. The process of claim 1 in which the oxidation catalyst composition is applied over the heat-stable polymer composition.

* * * * *